United States Patent
Ren

(10) Patent No.: US 12,452,352 B2
(45) Date of Patent: Oct. 21, 2025

(54) COMMUNICATION TERMINAL

(71) Applicant: HUIZHOU TCL MOBILE COMMUNICATION CO., LTD, Guangdong (CN)

(72) Inventor: Rui Ren, Guangdong (CN)

(73) Assignee: HUIZHOU TCL MOBILE COMMUNICATION CO., LTD, Guangdong (CN)

(*) Notice: Subject to any disclaimer, the term of this patent is extended or adjusted under 35 U.S.C. 154(b) by 662 days.

(21) Appl. No.: 17/758,969

(22) PCT Filed: Mar. 4, 2020

(86) PCT No.: PCT/CN2020/077678
§ 371 (c)(1),
(2) Date: Jan. 15, 2023

(87) PCT Pub. No.: WO2021/142896
PCT Pub. Date: Jul. 22, 2021

(65) Prior Publication Data
US 2023/0199098 A1    Jun. 22, 2023

(30) Foreign Application Priority Data
Jan. 17, 2020  (CN) .................. 202010053564.7

(51) Int. Cl.
*H04M 1/02* (2006.01)
*H01Q 1/24* (2006.01)

(52) U.S. Cl.
CPC .......... *H04M 1/0277* (2013.01); *H01Q 1/243* (2013.01); *H04M 1/0216* (2013.01)

(58) Field of Classification Search
CPC .. H04M 1/0277; H04M 1/0216; H04M 1/026; H01Q 1/243; H01Q 9/42; H01Q 1/242
See application file for complete search history.

(56) References Cited

U.S. PATENT DOCUMENTS

| | | | | |
|---|---|---|---|---|
| 5,027,394 A | * | 6/1991 | Ono | H04M 1/0216 379/438 |
| 5,681,176 A | * | 10/1997 | Ibaraki | H01R 35/025 439/31 |
| 7,251,512 B2 | * | 7/2007 | Komiyama | H04M 1/0214 439/165 |
| 7,394,650 B2 | * | 7/2008 | Zaderej | H05K 1/147 361/679.01 |

(Continued)

FOREIGN PATENT DOCUMENTS

| CN | 201426130 Y | 3/2010 |
|---|---|---|
| CN | 201910836 U | 7/2011 |

(Continued)

OTHER PUBLICATIONS

Written Opinion of the International Search Authority in international application No. PCT/CN2020/077678, mailed on Oct. 21, 2020.

(Continued)

*Primary Examiner* — Kenneth T Lam
(74) *Attorney, Agent, or Firm* — PV IP PC; Wei Te Chung

(57) ABSTRACT

A communication terminal includes an upper flip cover and a lower flip cover rotatably connected to each other. The upper flip cover is provided with a metal plate. The lower flip cover is provided with a system motherboard. The system motherboard is connected to the metal plate.

17 Claims, 1 Drawing Sheet

(56) References Cited

U.S. PATENT DOCUMENTS

| | | | | |
|---|---|---|---|---|
| 2008/0102907 A1* | 5/2008 | Komine | ............. | H04M 1/0216 |
| | | | | 16/239 |
| 2009/0023396 A1* | 1/2009 | Yamazaki | ............. | H01Q 7/005 |
| | | | | 455/75 |
| 2010/0207824 A1* | 8/2010 | Ide | ......... | H01Q 1/243 |
| | | | | 343/702 |
| 2012/0086610 A1 | 4/2012 | Nishikido et al. | | |
| 2013/0040712 A1* | 2/2013 | Nagano | ................. | H01Q 1/243 |
| | | | | 455/575.1 |
| 2022/0272185 A1* | 8/2022 | Ju | ......... | G06F 1/1681 |
| 2022/0321683 A1* | 10/2022 | Luo | .................... | H04M 1/0268 |

FOREIGN PATENT DOCUMENTS

| | | |
|---|---|---|
| CN | 102202120 A | 9/2011 |
| CN | 202206437 U | 4/2012 |
| CN | 202395824 U | 8/2012 |
| CN | 202957863 U | 5/2013 |
| CN | 203661128 U | 6/2014 |
| CN | 109950701 A | 6/2019 |

OTHER PUBLICATIONS

International Search Report in International application No. PCT/CN2020/077678 mailed on Oct. 21, 2020.

2nd Office Action issued in corresponding Chinese Patent Application No. 202010053564.7, dated Mar. 10, 2021, pp. 1-8.

Notification to Grant Patent Right For Invention issued in corresponding Chinese Patent Application No. 202010053564.7, dated Jul. 8, 2021, pp. 1-5.

\* cited by examiner

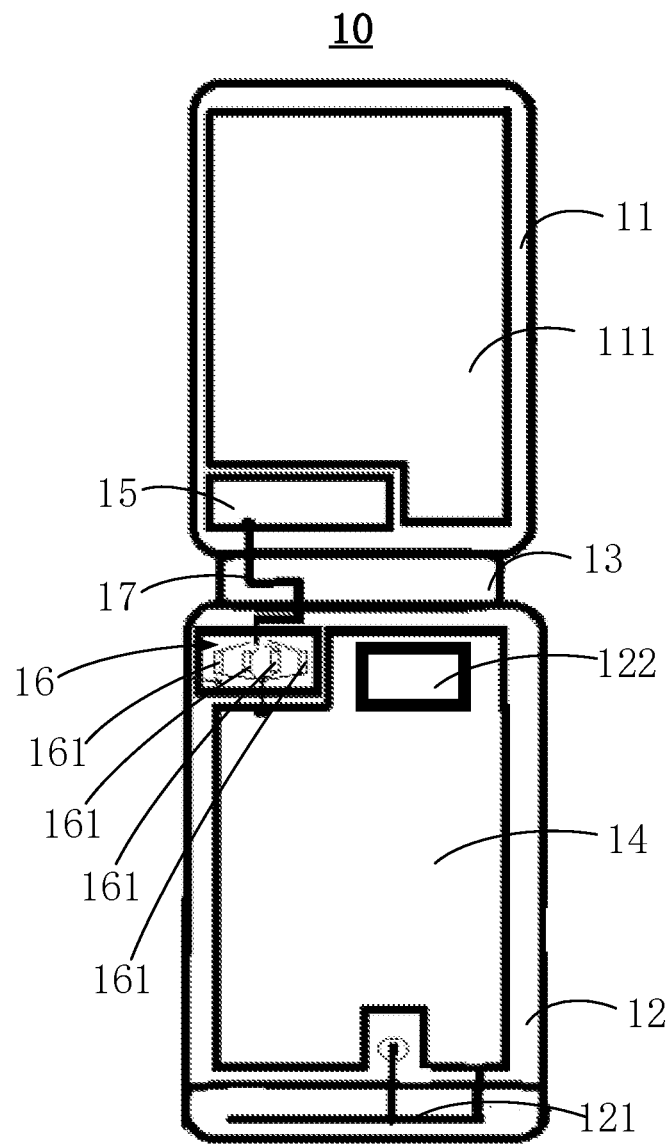

COMMUNICATION TERMINAL

CROSS REFERENCE

The present application is a US national phase application based upon an International Application No. PCT/CN2020/077678, filed on Mar. 4, 2020, which claims priority to Chinese Patent Application No. 202010053564.7, titled "Communication Terminal", filed on Jan. 17, 2020 with the China National Intellectual Property Administration, which is incorporated by reference in the present application in its entirety.

FIELD OF INVENTION

The present disclosure relates to the technical field of communication, and particularly to a communication terminal.

BACKGROUND

Antennas are important radio equipment for receiving and transmitting electromagnetic waves. Especially in the field of 4G and even 5G mobile communication, antenna performance of the antennas directly affects user experience of surfing the Internet, voice over long-term evolution, etc. For low-frequency signals, a main function of an antenna is to excite a main mode of a system motherboard. The stronger the excitation, the better the low-frequency bandwidth. And, only when a length of the system motherboard reaches a predetermined length, an excitation effect will be maximized, and a low-frequency performance will be the best. That is, a size of the system motherboard has become one of main factors restricting performance of a future 5G low-frequency antenna. Furthermore, flip phones have gradually developed from functional phones to smartphones at present. Nowadays, the flip phones are very popular in Europe, America, South Korea, Japan, and China, involving many models such as elderly models, light luxury models, and high-end business models. Mainstream operators in North America use a 600-700 M frequency band as a main frequency band for future 5G mobile phones. However, most of the flip phones are small in size. When a casing frame and an antenna clearance region are removed from a flip phone, a size of a remaining system motherboard is typically less than 3 inches. This is very unfavorable for realization of 5G low-frequency (600-900 MHz, especially 600-700 MHz).

That is, in the prior art, because a communication terminal is limited by a size of a system motherboard, low-frequency performance of the communication terminal cannot be improved.

SUMMARY OF DISCLOSURE

Technical Problem

The present disclosure provides a communication terminal, whose low-frequency performance is improved without enlarging a system motherboard.

Problem Solution

Technical Solution

In order to solve the aforementioned problem, the present disclosure provides a communication terminal. The communication terminal comprises an upper flip cover, a lower flip cover, a rotating shaft, and a metal elastic sheet. The upper flip cover is provided with a metal plate and a small flip plate. The lower flip cover is provided with a system motherboard. The system motherboard is connected to the metal plate. The upper flip cover and the lower flip cover are rotatably connected by the rotating shaft. The metal plate is located between the small flip plate and the rotating shaft. The metal elastic sheet is disposed in the rotating shaft and penetrates the rotating shaft. Two ends of the metal elastic sheet are respectively connected to the system motherboard and the metal plate, so that the system motherboard is connected to the metal plate.

In an embodiment, the communication terminal further comprises a main antenna. The main antenna is disposed on a side of the system motherboard away from the rotating shaft and is connected to the system motherboard.

In an embodiment, the main antenna is a built-in antenna. The main antenna is any one of a monopole antenna, a linear inverted-F antenna, a planar inverted-F antenna, and a loop antenna.

In an embodiment, the communication terminal further comprises an automatic tuning circuit. The automatic tuning circuit is disposed between the rotating shaft and the system motherboard. One end of the automatic tuning circuit is connected to the metal plate through the metal elastic sheet, and other end of the automatic tuning circuit is connected to the system motherboard. The automatic tuning circuit is configured to control a connection between the system motherboard and the metal plate.

In an embodiment, the communication terminal further comprises a diversity antenna. The diversity antenna is disposed between the system mainboard and the rotating shaft and is connected to the system mainboard. The diversity antenna and the automatic tuning circuit are arranged in sequence along an extending direction of the rotating shaft.

In an embodiment, the automatic tuning circuit comprises a switch circuit and two or more automatic tuning devices connected in parallel. One end of each of the automatic tuning devices is connected to the metal plate through the metal elastic sheet, other end of each of the automatic tuning devices is connected to the system motherboard through the switch circuit. The switch circuit controls the system mainboard to be connected to the metal plate through the automatic tuning devices.

In an embodiment, each of the automatic tuning devices comprises at least one of a capacitor and an inductor.

In an embodiment, the number of the automatic tuning devices is four, and the switch circuit is a single-pole four-throw switch.

The present disclosure further provides a communication terminal. The communication terminal comprises an upper flip cover, a lower flip cover, and a rotating shaft. The upper flip cover is provided with a metal plate and a small flip plate. The small flip plate is provided with a notch, and the metal plate is accommodated in the notch of the small flip plate and is connected to the small flip plate. The lower flip cover is provided with a system motherboard. The system motherboard is connected to the metal plate. The upper flip cover and the lower flip cover are rotatably connected by the rotating shaft. The metal plate is located between the small flip plate and the rotating shaft.

In an embodiment, the communication terminal further comprises a metal elastic sheet. The metal elastic sheet is disposed in the rotating shaft and penetrates the rotating shaft. Two ends of the metal elastic sheet are respectively connected to the system motherboard and the metal plate, so that the system motherboard is connected to the metal plate.

The present disclosure further provides a communication terminal. The communication terminal comprises an upper flip cover and a lower flip cover. The upper flip cover is provided with a metal plate. The lower flip cover is provided with a system motherboard and is rotatably connected to the upper flip cover. The system motherboard is connected to the metal plate.

In an embodiment, the communication terminal further comprises a rotating shaft and a metal elastic sheet. The upper flip cover and the lower flip cover are rotatably connected by the rotating shaft. The metal elastic sheet is disposed in the rotating shaft and penetrates the rotating shaft. Two ends of the metal elastic sheet are respectively connected to the system motherboard and the metal plate, so that the system motherboard is connected to the metal plate.

In an embodiment, the upper flip cover is further provided with a small flip plate. The metal plate is located between the small flip plate and the rotating shaft.

In an embodiment, the communication terminal further comprises a main antenna. The main antenna is disposed on a side of the system motherboard away from the rotating shaft and is connected to the system motherboard.

In an embodiment, the main antenna is a built-in antenna. The main antenna is any one of a monopole antenna, a linear inverted-F antenna, a planar inverted-F antenna, and a loop antenna.

In an embodiment, the communication terminal further comprises an automatic tuning circuit. The automatic tuning circuit is disposed between the rotating shaft and the system motherboard. One end of the automatic tuning circuit is connected to the metal plate through the metal elastic sheet, and other end of the automatic tuning circuit is connected to the system motherboard. The automatic tuning circuit is configured to control a connection between the system motherboard and the metal plate.

In an embodiment, the communication terminal further comprises a diversity antenna. The diversity antenna is disposed between the system mainboard and the rotating shaft and is connected to the system mainboard. The diversity antenna and the automatic tuning circuit are arranged in sequence along an extending direction of the rotating shaft.

In an embodiment, the automatic tuning circuit comprises a switch circuit and two or more automatic tuning devices connected in parallel. One end of each of the automatic tuning devices is connected to the metal plate through the metal elastic sheet, other end of each of the automatic tuning devices is connected to the system motherboard through the switch circuit. The switch circuit controls the system mainboard to be connected to the metal plate through the automatic tuning devices.

In an embodiment, each of the automatic tuning devices comprises at least one of a capacitor and an inductor.

In an embodiment, the number of the automatic tuning devices is four, and the switch circuit is a single-pole four-throw switch.

The present invention has the following beneficial effects. Different from the prior art, the present disclosure provides a communication terminal comprising an upper flip cover and a lower flip cover, wherein the upper flip cover is provided with a metal plate, the lower flip cover is provided with a system motherboard and is rotatably connected to the upper flip cover, and the system motherboard is connected to the metal plate. In the communication terminal of the present disclosure, the metal plate is disposed on the upper flip cover and is connected to the system motherboard on the lower flip cover. When the upper flip cover of the communication terminal is opened, the metal plate extends a length of the system motherboard, thereby improving low-frequency performance of the communication terminal without enlarging the system motherboard.

BRIEF DESCRIPTION OF DRAWINGS

In order to more clearly illustrate technical solutions in embodiments of the present disclosure, a brief description of accompanying drawings used in the embodiments will be given below. The accompanying drawings in the following description are merely some embodiments of the present disclosure. For those skilled in the art, other drawings may be obtained from these accompanying drawings without creative labor.

FIG. 1 is a schematic structural diagram of a communication terminal according to an embodiment of the present disclosure.

DETAILED DESCRIPTION

Technical solutions in embodiments of the present disclosure will be clearly and completely described below in conjunction with accompanying drawings in the embodiments of the present disclosure. It is apparent that the described embodiments are merely some of the embodiments of the present disclosure and not all embodiments. All other embodiments obtained by those skilled in the art based on the embodiments of the present disclosure without creative labor are within claimed scope of the present disclosure.

In the description of the present disclosure, it should be understood that location or position relationships indicated by terms, such as "center", "longitudinal", "transverse", "length", "width", "thickness", "up", "down", "front", "rear", "left", "right", "vertical", "horizontal", "top", "bottom", "within", and "outside", are location or position relationships based on illustration of the accompanying drawings, are merely used for describing the present disclosure and simplifying the description instead of indicating or implying the indicated apparatuses or elements should have specified locations or be constructed and operated according to specified locations, and Thereof, should not be intercepted as limitations to the present disclosure. Furthermore, terms such as "first" and "second" are used merely for description, but shall not be construed as indicating or implying relative importance or implicitly indicating a number of the indicated technical feature. Hence, the feature defined with "first" and "second" may explicitly or implicitly includes one or more such features. In the description of the present disclosure, a term "a plurality of" means "two or more" unless otherwise specifically limited.

In the present disclosure, a term "exemplary" means "serving as an example, instance, or illustration." Any embodiment described herein as "exemplary" is not necessarily construed as being more preferable or advantageous than other embodiments. The following description is presented to enable any skilled in the art to make and use the present invention. Details are set forth in the following description for purpose of explanation. It should be noted that those skilled in the art can realize that the present invention can also be implemented without using these specific details. In other embodiments, well-known structures and processes are not elaborated, so as to prevent unnecessary details from obscuring a description of the present invention. Therefore, the present invention is not intended to be limited by the embodiments, but is accorded with the widest scope consistent with principles and features disclosed herein.

The present disclosure provides a communication terminal comprising an upper flip cover and a lower flip cover, wherein the upper flip cover is provided with a metal plate, the lower flip cover is provided with a system motherboard and is rotatably connected to the upper flip cover, and the system motherboard is connected to the metal plate, which will be described in detail below.

Please refer to FIG. 1, which is a schematic structural diagram of a communication terminal according to an embodiment of the present disclosure.

In an embodiment of the present disclosure, a communication terminal 10 includes an upper flip cover 11 and a lower flip cover 12 that are rotatably connected to each other. The lower flip cover 12 is provided with a system motherboard 14. The upper flip cover 11 is provided with a metal plate 15. The system motherboard 14 is connected to the metal plate 15. The system motherboard 14 is where a system of the communication terminal 10 is located. The metal plate 15 may be shaped as a rectangle, a triangle, a circle, etc. A size of the metal plate 15 is set according to specific conditions, which is not limited herein. In the communication terminal 10 of the present disclosure, the metal plate 15 is disposed on the upper flip cover 11 and is connected to the system motherboard 14 on the lower flip cover 12. When the upper flip cover 11 of the communication terminal 10 is opened, the metal plate 15 extends a length of the system motherboard 14, thereby improving low-frequency performance of the communication terminal 10 without enlarging the system motherboard 14. The lower flip cover 12 may be further provided with a keyboard for inputting operation signals. The lower flip cover 12 may be further provided with a microphone on a side of the keyboard for inputting auditory information. The lower flip cover 12 may be further provided with a battery on its back for power supply, and the battery is detachably installed inside the lower flip cover 12.

In the embodiment of the disclosure, the upper flip cover 11 and the lower flip cover 12 are rotatably connected by a rotating shaft 13. A metal elastic sheet 17 is disposed in the rotating shaft 13, and the metal elastic sheet 17 penetrates the rotating shaft 13. Two ends of the metal elastic sheet 17 are respectively connected to the system motherboard 14 and the metal plate 15, so that the system motherboard 14 is connected to the metal plate 15. Because the metal elastic sheet 17 penetrates the rotating shaft 13, and the two ends of the metal elastic sheet 17 are respectively connected to the system motherboard 14 and the metal plate 15, on the one hand, the metal elastic sheet 17 is hidden in the rotating shaft 13, which protects the metal elastic sheet 17 and prevents the metal elastic sheet 17 from conducting with other objects, rusting, etc. On the other hand, due to elasticity of the metal elastic sheet 17, the metal elastic sheet 17 can replace an elastic member for opening the upper flip cover 11 to prevent the upper flip cover 11 from closing during use of the communication terminal 10.

In the embodiment of the present disclosure, the upper flip cover 11 is further provided with a small flip plate 111, and the metal plate 15 is located between the small flip plate 111 and the rotating shaft 13. The small flip plate 111 is provided with a notch, and the metal plate 15 is accommodated in the notch of the small flip plate 111 and is connected to the small flip plate 111. The notch may be located at a lower left corner, a lower right corner, etc. of the small flip plate 111, which is not limited herein. The number of the metal plate 15 may be two or more. For example, the number of the metal plate 15 is two, and the flip small cover 111 is provided with two notches on a side close to the rotating shaft 13 and a side away from the rotating shaft 13, respectively. The two metal plates 15 are connected to each other. The two metal plates 15 are respectively accommodated in the two notches. The length of the system motherboard 14 is further extended by the two interconnected metal plates 15, thereby further improving the low-frequency performance of the communication terminal 10.

Specifically, the small flip plate 111 may be a display. The display may be a liquid crystal display (LCD) or an organic light emitting display (OLED). The LCD is constructed by placing a liquid crystal cell between two parallel glass substrates. A lower glass substrate is provided with thin film transistors. An upper glass substrate is provided with a color filter. Rotation directions of liquid crystal molecules are controlled by signal and voltage changes on the thin film transistors, so as to control whether each pixel emits polarized light, thereby achieving the purpose of display. OLED (also known as organic electroluminesence display and organic light emitting semiconductor) belongs to a current-type organic light-emitting device, which emits light through injection and recombination of carriers, and its luminous intensity is proportional to an amount of injected current. Under action of an electric field, holes generated by an anode and electrons generated by a cathode will respectively move to a hole transport layer and an electron transport layer, and migrate to a light-emitting layer. When the holes and the electrons meet in the light-emitting layer, energy excitons are generated, thereby exciting light-emitting molecules to generate visible light finally. The upper flip cover 11 is further provided with a speaker at its upper end for outputting auditory information.

In an embodiment, the communication terminal 10 further comprises a main antenna 121. The main antenna 121 is disposed on a side of the system motherboard 14 away from the rotating shaft 13. The main antenna 121 is connected to the system motherboard 14. The communication terminal 10 further comprises a diversity antenna 122. The diversity antenna 122 is disposed between the system mainboard 14 and the rotating shaft 13. The main antenna 121 and the diversity antenna 122 are respectively disposed at two opposite ends of the system motherboard 14 to increase a signal strength of the communication terminal 10. Diversity is to separate received multi-path signals into irrelevant multi-channel signals, and then combine energies of the multi-channel signals according to certain rules to maximize energies of received useful signals, thereby increasing signal-to-noise ratios of the received useful signals. Therefore, diversity reception includes two aspects: one is how to separate received multi-path signals into irrelevant multi-channel signals, and the other is how to properly combine the separated multi-channel signals to obtain maximum signal-to-noise ratios. Diversity is divided into macro-diversity and micro-diversity. Macro-diversity is also called multi-base station diversity, and is mainly used to prevent slow-fading. For example, in a mobile communication system, multiple base stations are disposed at different physical locations (such as a diagonal of a cell), and transmit a same signal at the same time. A mobile station in the cell selects the best base station to communicate with it, so as to reduce slow-fading caused by terrain, objects, and atmosphere to the signal. Radio 0 is the main antenna 121, responsible for transmission and reception of radio-frequency signals. Radio 1 is the diversity antenna 122, which only receives but does not transmit radio-frequency signals. The base stations will combine the radio-frequency signals received by the main antenna 121 and the diversity antenna 122 to obtain a diversity gain. Therefore, the diversity gain herein is a receiving gain. Diversity reception is mainly used to cancel an effect of fast-fading on received signals. During transmission, a signal generates multi-path component signals due to interference such as reflections. A receiving end simultaneously receives signals from different paths through multiple antennas, and then selects and combines these signals into a total signal, so as to reduce influence of signal fading, which is called diversity reception. Diversity is to combine separately obtained signals. As long as several signals are independent of each other, a maximum signal gain can be obtained after proper combination.

In an embodiment, the main antenna 121 is a built-in antenna. The main antenna 121 is any one of a monopole antenna, a linear inverted-F antenna, a planar inverted-F antenna, and a loop antenna. The diversity antenna 122 may also be a built-in antenna. The diversity antenna 122 is any one of a monopole antenna, a linear inverted-F antenna, a planar inverted-F antenna, and a loop antenna. The monopole antenna is a vertical antenna having a quarter wavelength, and the monopole antenna is mounted on a ground plane. The ground plane may be an actual ground, or may be a man-made ground such as a tool-carrying body. The monopole antenna is fed through a coaxial cable at its lower end, and a ground conductor of the coaxial cable is connected to a platform. In free space, a radiation pattern of a quarter-wave monopole antenna in a vertical plane is similar in shape to a radiation pattern of a half-wave dipole antenna in a vertical plane, but without subsurface radiation. In a horizontal plane, a vertical monopole antenna is omnidirectional. A full English name of "IFA antenna" is "Inverted F-shaped Antenna", that is, a linear inverted-F antenna. A full English name of "PIFA antenna" is "Planar Inverted F-shaped Antenna", that is, a planar inverted-F antenna. Because an entirety of the planar inverted-F antenna is shaped like an inverted letter F, it is so named. A basic structure of the planar inverted-F antenna includes a plane radiating element as a radiator, and two pins disposed on the radiator and close to each other and respectively used as grounding and feeding points. And, a large ground is used as a reflective surface. A loop antenna is a metal wire wound into a certain shape, such as a circle, a square, a triangle, etc., and two ends of the metal wire are used as output ends. A metal wire that is wound into multiple turns (such as helically or overlapped) is called a multi-turn loop antenna.

Obviously, when the length of the system motherboard 14 is extended, the length of the system motherboard 14 is closer to a quarter wavelength. At this time, an excitation effect of the antenna set antenna 121 and the diversity antenna 122 on the system motherboard 14 is maximized, and a low-frequency performance is optimized.

In an embodiment, the communication terminal 100 further comprises an automatic tuning circuit 16. The automatic tuning circuit 16 is disposed between the rotating shaft 13 and the system motherboard 14. One end of the automatic tuning circuit 16 is connected to the metal plate 15 through the metal elastic sheet 15, and other end of the automatic tuning circuit 16 is connected to the system motherboard 14. The automatic tuning circuit 16 is configured to control a connection between the system motherboard 14 and the metal plate 15. The connection between the system motherboard 14 and the metal plate 15 is controlled by the automatic tuning circuit 16. The system motherboard 14 is connected to the metal plate 15 only when a low-frequency signal is detected, thereby improving the low-frequency performance of the communication terminal 10. When a high-frequency signal is detected, the system motherboard 14 and the metal plate 15 are disconnected, thereby reducing power consumption of the communication terminal 10.

In an embodiment, the diversity antenna 122 is connected to the system mainboard 14. The diversity antenna 122 and the automatic tuning circuit 16 are arranged in sequence along an extending direction of the rotating shaft 13 so that devices on the lower flip cover 12 can be reasonably arranged.

In an embodiment, the automatic tuning circuit 16 comprises a switch circuit and two or more automatic tuning devices 161 connected in parallel. One end of each of the automatic tuning devices 161 is connected to the metal plate 15 through the metal elastic sheet 17, other end of each of the automatic tuning devices 161 is connected to the system motherboard 14 through the switch circuit. The switch circuit controls the system mainboard 14 to be connected to the metal plate 15 through the automatic tuning devices 161. Specifically, each of the automatic tuning devices comprises at least one of a capacitor and an inductor. The number of the capacitor and the number of the inductor in each of the automatic tuning devices 161 are set according to specific conditions. An inductance value of each inductor and a capacitance value of each capacitor are set according to specific conditions. A processor of the communication terminal 10 can control the automatic tuning circuit 16 to connect different capacitors or inductors according to frequencies of detected low-frequency signals, so that the communication terminal 10 has better performance when processing low-frequency signals of different frequencies.

In a specific embodiment, the number of the automatic tuning devices 161 is four, and the switch circuit is a single-pole four-throw switch. The four automatic tuning devices 161 are a first automatic tuning device, a second automatic tuning device, a third automatic tuning device, and a fourth automatic tuning device. The capacitors and the inductors in the four automatic tuning devices 161 are set, so that when the system motherboard 14 is connected to the first automatic tuning device, passive antenna efficiency of the communication terminal 10 for processing a 600 MHz low-frequency signal is the maximum. And, when the system motherboard 14 is connected to the second automatic tuning device, passive antenna efficiency of the communication terminal 10 for processing a 700 MHz low-frequency signal is the maximum. And, when the system motherboard 14 is connected to the third automatic tuning device, passive antenna efficiency of the communication terminal 10 for processing an 800 MHz low-frequency signal is the maximum. And, when the system motherboard 14 is connected to the fourth automatic tuning device, passive antenna efficiency of the communication terminal 10 for processing a 900 MHz low-frequency signal is the maximum. Because the present application is mainly aimed at low-frequency signals of 600 MHz-900 MHz, four automatic tuning devices 161 are disposed and correspond to optimal frequencies of the low-frequency signals, i.e., 600 MHz, 700 MHz, 800 MHz, and 900 MHz, respectively. The number of the automatic tuning devices 161 and corresponding frequencies of the low-frequency signals may be increased or decreased as required. For example, four automatic tuning devices 161 are disposed and correspond to optimal frequencies of the low-frequency signals, i.e., 650 MHz, 750 MHz, 850 MHz, and 950 MHz, respectively. In order to process low-frequency signals of different frequencies more finely, eight automatic tuning devices 161 may be disposed and correspond to optimal frequencies of the low-frequency signals, i.e., 600 MHz, 650 MHz, 700 MHz, 750 MHz, 800 MHz, 850 MHz, 900 MHz, and 950 MHz, respectively.

TABLE 1

| Frequency | Original state | Metal plate | Metal plate + First automatic tuning device | Metal plate + Second automatic tuning device | Metal plate + Third automatic tuning device | Metal plate + Fourth automatic tuning device |
|---|---|---|---|---|---|---|
| 600 | −12.63 | −9.69 | −8.05 | | | |
| 620 | −12.44 | −9.51 | −8.02 | | | |
| 640 | −11.38 | −8.69 | −7.76 | | | |
| 660 | −10.7 | −8.03 | −6.73 | | | |
| 680 | −10.28 | −7.95 | −6.45 | | | |
| 700 | −9.89 | −7.43 | | −5.89 | | |
| 720 | −9.28 | −7.37 | | −5.58 | | |
| 740 | −9.01 | −7.13 | | −5.51 | | |
| 760 | −8.32 | −7.1 | | −5.32 | | |
| 780 | −8.16 | −6.88 | | −5.16 | | |
| 800 | −7.97 | −5.84 | | | −4.98 | |
| 820 | −7.84 | −5.72 | | | −4.86 | |
| 840 | −7.64 | −5.89 | | | −4.53 | |
| 860 | −7.46 | −5.11 | | | −4.25 | |
| 880 | −7.46 | −5.29 | | | −4.07 | |
| 900 | −7.58 | −5.93 | | | | −4.88 |
| 920 | −8.2 | −5.62 | | | | −4.77 |
| 940 | −8.23 | −5.99 | | | | −4.80 |
| 960 | −8.33 | −6.32 | | | | −5.04 |

In addition, the automatic tuning devices 161 may also be set according to a frequency band of low-frequency signals to be processed. For example, if the frequency band of the low-frequency signals to be processed is 400 MHz to 500 MHz, four automatic tuning devices 161 may be disposed and correspond to optimal frequencies of the low-frequency signals, i.e., 400 MHz, 430 MHz, 460 MHz, and 500 MHz, respectively.

The switch circuit is a single-pole four-throw switch. When the processor of the communication terminal 10 detects one low-frequency signal, the processor controls the switch circuit to connect one corresponding automatic tuning device 161 to the system motherboard 14.

Please refer to Table 1, when frequencies of the low-frequency signals are 600 MHz, 620 MHz, 640 MHz, 660 MHz, and 680 MHz, the control switch circuit is controlled to connect the first automatic tuning device to the system motherboard 14. When the frequencies of the low-frequency signals are 700 MHz, 720 MHz, 740 MHz, 760 MHz, and 780 MHz, the control switch circuit is controlled to connect the first automatic tuning device to the system motherboard 14. When the frequencies of the low-frequency signals are 800 MHz, 820 MHz, 840 MHz, 860 MHz, and 880 MHz, the control switch circuit is controlled to connect the first automatic tuning device to the system motherboard 14. When the frequencies of the low-frequency signals are 900 MHz, 920 MHz, 940 MHz, 960 MHz, and 980 MHz, the control switch circuit is controlled to connect the first automatic tuning device to the system motherboard 14.

The data in Table 1 represents, for low-frequency signals of different frequencies, a return loss of the communication terminal 10 in an original state, a return loss of the communication terminal 10 after the system motherboard 14 is connected to the metal plate 15, a return loss of the communication terminal 10 after the system motherboard 14 is connected to the metal plate 15 through one corresponding automatic tuning device 161. The communication terminal 10 is in the original state, which means that the system motherboard 14 is neither connected to the metal plate 15 nor the automatic tuning device 161. Return loss, also known as reflection loss, is reflection of a cable link due to impedance mismatch, which is reflection of cables themselves. Impedance mismatch mainly occurs at a connection point, but may also occur at a part of a cable where impedance changes. Therefore, the essence of the present application is to improve the return loss. The return loss causes signal fluctuation. A returned signal will be mistaken for a received signal by a duplex Gigabit Ethernet, resulting in confusion. Return loss is a ratio of a reflected wave power to an incident wave power at a transmission line port, its unit is dB, and it can be used to measure passive antenna efficiency. The unit of frequency is MHz. For example, when the frequency of the low-frequency signal is 600 MHz, the return loss of the communication terminal 10 in the original state is −12.63 dB, the return loss of the communication terminal 10 after the system motherboard 14 is connected to the metal plate 15 is −9.69 dB, and the return loss of the communication terminal 10 after the system motherboard 14 is connected to the metal plate 15 through the first automatic tuning device is −8.05 dB. When the frequency of the low-frequency signal is 760 MHz, the return loss of the communication terminal 10 in the original state is −8.32 dB, the return loss of the communication terminal 10 after the system motherboard 14 is connected to the metal plate 15 is −7.1 dB, and the return loss of the communication terminal 10 after the system motherboard 14 is connected to the metal plate 15 through the first automatic tuning device is −5.32 dB. Therefore, it is not difficult to find that in the present application, connecting the system motherboard 14 to the metal plate 15 improves the return loss of the communication terminal 10, thereby improving the passive antenna efficiency of the communication terminal 10. Further, connecting the system motherboard 14 to the metal plate 15 through one corresponding automatic tuning device 161 further improves the return loss of the communication terminal 10, thereby further improving the passive antenna efficiency of the communication terminal 10.

Different from the prior art, the present disclosure provides a communication terminal comprising an upper flip cover and a lower flip cover, wherein the upper flip cover is provided with a metal plate, the lower flip cover is provided with a system motherboard and is rotatably connected to the upper flip cover, and the system motherboard is connected to the metal plate. In the communication terminal of the present disclosure, the metal plate is disposed on the upper flip cover and is connected to the system motherboard on the lower flip cover. When the upper flip cover of the communication terminal is opened, the metal plate extends a length of the system motherboard, thereby improving low-frequency performance of the communication terminal without enlarging the system motherboard.

The communication terminal provided by the embodiments of the present disclosure is described in detail above. The present disclosure uses specific examples to describe principles and embodiments of the present invention. The above description of the embodiments is only for helping to understand solutions of the present disclosure and its core ideas. Furthermore, those skilled in the art may make modifications to the specific embodiments and applications according to ideas of the present invention. In conclusion, the present specification should not be construed as a limitation to the present invention.

What is claimed is:

1. A communication terminal, comprising:
    an upper flip cover provided with a metal plate and a small flip plate;
    a lower flip cover provided with a system motherboard, wherein the system motherboard is connected to the metal plate;
    a rotating shaft, wherein the upper flip cover and the lower flip cover are rotatably connected by the rotating shaft, and the metal plate is located between the small flip plate and the rotating shaft;
    a metal elastic sheet disposed in the rotating shaft and penetrating the rotating shaft, wherein two ends of the metal elastic sheet are respectively connected to the system motherboard and the metal plate, so that the system motherboard is connected to the metal plate; and
    an automatic tuning circuit disposed between the rotating shaft and the system motherboard, wherein one end of the automatic tuning circuit is connected to the metal plate through the metal elastic sheet, other end of the automatic tuning circuit is connected to the system motherboard, and the automatic tuning circuit is configured to control a connection between the system motherboard and the metal plate.

2. The communication terminal according to claim 1, further comprising:
    a main antenna disposed on a side of the system motherboard away from the rotating shaft and connected to the system motherboard.

3. The communication terminal according to claim 2, wherein the main antenna is a built-in antenna and is any one of a monopole antenna, a linear inverted-F antenna, a planar inverted-F antenna, and a loop antenna.

4. The communication terminal according to claim 1, further comprising:
    a diversity antenna disposed between the system mainboard and the rotating shaft and connected to the system mainboard, wherein the diversity antenna and the automatic tuning circuit are arranged in sequence along an extending direction of the rotating shaft.

5. The communication terminal according to claim 1, wherein the automatic tuning circuit comprises a switch circuit and two or more automatic tuning devices connected in parallel, one end of each of the automatic tuning devices is connected to the metal plate through the metal elastic sheet, other end of each of the automatic tuning devices is connected to the system motherboard through the switch circuit, and the switch circuit controls the system mainboard to be connected to the metal plate through the automatic tuning devices.

6. The communication terminal according to claim 5, wherein each of the automatic tuning devices comprises at least one of a capacitor and an inductor.

7. The communication terminal according to claim 5, wherein the number of the automatic tuning devices is four, and the switch circuit is a single-pole four-throw switch.

8. A communication terminal, comprising:
    an upper flip cover provided with a metal plate and a small flip plate, wherein the small flip plate is provided with a notch, and the metal plate is accommodated in the notch of the small flip plate and is connected to the small flip plate;
    a lower flip cover provided with a system motherboard, wherein the system motherboard is connected to the metal plate;
    a rotating shaft, wherein the upper flip cover and the lower flip cover are rotatably connected by the rotating shaft, and the metal plate is located between the small flip plate and the rotating shaft;
    a metal elastic sheet disposed in the rotating shaft and penetrating the rotating shaft; and
    an automatic tuning circuit disposed between the rotating shaft and the system motherboard, wherein one end of the automatic tuning circuit is connected to the metal plate through the metal elastic sheet, other end of the automatic tuning circuit is connected to the system motherboard, and the automatic tuning circuit is configured to control a connection between the system motherboard and the metal plate.

9. The communication terminal according to claim 8, wherein two ends of the metal elastic sheet are respectively connected to the system motherboard and the metal plate, so that the system motherboard is connected to the metal plate.

10. A communication terminal, comprising:
    an upper flip cover provided with a metal plate; and
    a lower flip cover provided with a system motherboard and rotatably connected to the upper flip cover, wherein the system motherboard is connected to the metal plate;
    a rotating shaft, wherein the upper flip cover and the lower flip cover are rotatably connected by the rotating shaft;
    a metal elastic sheet disposed in the rotating shaft and penetrating the rotating shaft, wherein two ends of the metal elastic sheet are respectively connected to the system motherboard and the metal plate, so that the system motherboard is connected to the metal plate; and
    an automatic tuning circuit disposed between the rotating shaft and the system motherboard, wherein one end of the automatic tuning circuit is connected to the metal plate through the metal elastic sheet, other end of the automatic tuning circuit is connected to the system motherboard, and the automatic tuning circuit is configured to control a connection between the system motherboard and the metal plate.

11. The communication terminal according to claim 10, wherein the upper flip cover is further provided with a small flip plate, wherein the metal plate is located between the small flip plate and the rotating shaft.

12. The communication terminal according to claim 10, further comprising:
    a main antenna disposed on a side of the system motherboard away from the rotating shaft and connected to the system motherboard.

13. The communication terminal according to claim 12, wherein the main antenna is a built-in antenna and is any one of a monopole antenna, a linear inverted-F antenna, a planar inverted-F antenna, and a loop antenna.

14. The communication terminal according to claim 10, further comprising:
a diversity antenna disposed between the system mainboard and the rotating shaft and connected to the system mainboard, wherein the diversity antenna and the automatic tuning circuit are arranged in sequence along an extending direction of the rotating shaft.

15. The communication terminal according to claim 10, wherein
the automatic tuning circuit comprises a switch circuit and two or more automatic tuning devices connected in parallel, one end of each of the automatic tuning devices is connected to the metal plate through the metal elastic sheet, other end of each of the automatic tuning devices is connected to the system motherboard through the switch circuit, and the switch circuit controls the system mainboard to be connected to the metal plate through the automatic tuning devices.

16. The communication terminal according to claim 15, wherein each of the automatic tuning devices comprises at least one of a capacitor and an inductor.

17. The communication terminal according to claim 15, wherein the number of the automatic tuning devices is four, and the switch circuit is a single-pole four-throw switch.

* * * * *